United States Patent
Michishita et al.

(10) Patent No.: US 11,021,766 B2
(45) Date of Patent: Jun. 1, 2021

(54) DIRECT REDUCTION WITH COAL GASIFICATION AND COKE OVEN GAS

(71) Applicants: Haruyasu Michishita, Charlotte, NC (US); John Winter, Charlotte, NC (US)

(72) Inventors: Haruyasu Michishita, Charlotte, NC (US); John Winter, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 787 days.

(21) Appl. No.: 15/802,900

(22) Filed: Nov. 3, 2017

(65) Prior Publication Data

US 2018/0119236 A1    May 3, 2018

Related U.S. Application Data

(60) Provisional application No. 62/416,887, filed on Nov. 3, 2016.

(51) Int. Cl.
| | |
|---|---|
| C21B 13/00 | (2006.01) |
| C21B 13/02 | (2006.01) |
| C10J 3/02 | (2006.01) |
| C10J 3/48 | (2006.01) |

(52) U.S. Cl.
CPC ............ *C21B 13/0086* (2013.01); *C10J 3/02* (2013.01); *C10J 3/485* (2013.01); *C21B 13/0073* (2013.01); *C21B 13/02* (2013.01); *C21B 13/029* (2017.05); *C10J 2300/093* (2013.01); *C10J 2300/0943* (2013.01); *C10J 2300/0959* (2013.01); *C10J 2300/0976* (2013.01); *C10J 2300/12* (2013.01); *C21B 2100/24* (2017.05); *C21B 2100/282* (2017.05); *C21B 2100/42* (2017.05); *C21B 2100/80* (2017.05)

(58) Field of Classification Search
CPC .................... C10J 2300/0989; C10J 2300/095
See application file for complete search history.

(56) References Cited

U.S. PATENT DOCUMENTS

| | | | |
|---|---|---|---|
| 4,483,691 | A | 11/1984 | McShea et al. |
| 5,785,733 | A | 7/1998 | Lee et al. |
| 6,200,363 | B1 | 3/2001 | Whitten, Jr. et al. |

(Continued)

FOREIGN PATENT DOCUMENTS

| | | |
|---|---|---|
| AT | 387037 B | 11/1998 |
| CN | 102304599 A | 1/2012 |
| DE | 2908763 A1 | 9/1979 |

OTHER PUBLICATIONS

Mizutani, Application of Coke Oven Gas to MIDREX® Process, Kobelco Technology Review No. 33 Feb. 2015, (Year: 2015).*

(Continued)

*Primary Examiner* — Anthony J Zimmer
*Assistant Examiner* — Michael J Kachmarik
(74) *Attorney, Agent, or Firm* — Clements Bernard Walker; Christopher L. Bernard

(57) ABSTRACT

A method and apparatus for producing direct reduced iron (DRI), including: generating a reducing gas in a coal gasifier using coal, oxygen, steam, and a first coke oven gas (COG) stream as inputs to the coal gasifier; and delivering the reducing gas to a shaft furnace and exposing iron ore agglomerates to the reducing gas to form metallic iron agglomerates. The method further includes delivering a second COG stream directly to the shaft furnace.

11 Claims, 5 Drawing Sheets

(56) References Cited

U.S. PATENT DOCUMENTS

| | | |
|---|---|---|
| 8,776,844 B1 | 7/2014 | Yaegel |
| 2002/0079625 A1 | 6/2002 | Pavlicevic et al. |
| 2009/0211401 A1 | 8/2009 | Zendejas-martinez |
| 2014/0091502 A1 | 4/2014 | Wright et al. |
| 2014/0252699 A1 | 9/2014 | Sakaguchi et al. |
| 2014/0260803 A1 | 9/2014 | Zendejas-martinez |
| 2015/0329358 A1* | 11/2015 | Konda .................. C10J 3/46 252/373 |
| 2016/0208351 A1 | 7/2016 | Motamedhashemi |
| 2018/0119236 A1 | 5/2018 | Michishita et al. |

OTHER PUBLICATIONS

CN102304599A EPO machine translation (Year: 2012).*
Feb. 20, 2018 International Search Report issued in International Patent Application No. PCT/US2017/059682.
Jun. 25, 2018 International Search Report issued in International Patent Application No. PCT/US2017/059864.

\* cited by examiner

DIRECT REDUCTION WITH COAL GASIFICATION AND COKE OVEN GAS

CROSS-REFERENCE TO RELATED APPLICATION

The present patent application/patent claims the benefit of priority of U.S. Provisional Patent Application No. 62/416,887, filed on Nov. 3, 2016, and entitled "DIRECT REDUCTION WITH COAL GASIFICATION AND COKE OVEN GAS," the contents of which are incorporated in full by reference herein.

FIELD OF THE INVENTION

The present invention relates generally to methods and apparatuses for the direct reduction (DR) of iron. More specifically, the present invention relates to methods and apparatuses for the DR of iron with coal gasification and coke oven gas (COG).

BACKGROUND OF THE INVENTION

COG contains tar and heavy hydrocarbons that result in carbon deposits in reducing gas ducts and process gas heater tubes when the COG is used in a DR process. The energy of such tar and heavy hydrocarbons is disadvantageously lost, however, when the tar and heavy hydrocarbons are simply removed at a pretreatment facility. When the tar and heavy hydrocarbons are recovered as chemical byproducts, high capital investment is required.

COG contains 20-30% CH4, which must be converted to CO or H2 for use in a DR process. Too much CH4 in a reducing gas results in too much cracking or insitu reforming in the shaft furnace, which lowers the temperature and slows iron reduction reaction kinetics in the shaft furnace. The excess CH4 is normally reformed with a tubular reformer or auto-thermal reformer outside of the shaft furnace, but sulfur in the COG can be an issue with the catalyst associated with the reformer. A partial oxidation (PDX) system can be applied to the COG, but the product gas quality (i.e. reducibility) is not very high due to the oxygen requirement to dissociate the tar and heavy hydrocarbons to prevent soot formation.

COG contains sulfur compounds that are absorbed by the direct reduced iron (DRI) product during the DR process, unless the sulfur is remove beforehand. Thus, the steelmaking shop requires an additional sulfur removal step to process DRI of higher sulfur content.

As a result, the amount of COG applicable to a DR process is very limited without COG pretreatment (typically ~10-20% of the total feedstock gas).

The excess COG (i.e. the available amount of COG) is not enough to justify the economy of a DR plant at steel mills since COG is usually used by other steel product processes as the high calorific fuel gas. On the other hand, a coal gasification plant is typically applied in the chemical industry and the existing plant scale is not as large as the production scale of steel mills. So both plants need a way to scale up further without investing too much capital.

Thus, to make a COG-based DR plant large enough to be economically feasible, the additional reduction gas must be made up by natural gas or another syngas, such as coal gasification syngas. It makes sense to use both COG and coal gasification syngas, since both feedstock gases implicate a similar DR process, including a process gas heater and CO2 removal. The ordinary steel mill has a coke oven and coal handling infrastructure necessary for a coal gasification plant. Natural gas is not always available at steel mills though.

It is not, however, economical to install a separate COG pretreatment facility and a coal gasification plant, as is require conventionally. Thus, it is desirable to combine the two plants, at least by common gas treatments, such as an acid gas removal (AGR) system, but COG must be treated before introducing a coal syngas treatment system since tar or heavy hydrocarbons in COG deteriorates the solvent and/or absorbent. Note that COG is commonly treated to recover the tar, heavy hydrocarbon, and sulfur as by-products at a coke oven plant in steel mills, but the treated COG at a coke oven plant typically only meets the purity specification for fuel gas usage in steel mills. The COG purity specification is not high enough to apply for the common AGR before sending COG to DR processes. So, the additional COG pretreatment is required anyway, which is not very efficient or economical.

Directly injecting COG into a coal gasifier faces many technical difficulties. The conventional coal gasification technologies cannot process both coal and COG simultaneously in a technically or economically viable manner, due to the different requirements for pressure, temperature, residence time, and atmosphere to treat COG in the reactor. It requires a higher temperature, more residence time, and/or more oxidant (i.e. steam) to reform CH4 and dissociate tar and/or heavy hydrocarbons in COG.

Thus, what is still needed in the art is a DR process that utilizes COG by injecting it into a coal gasification reactor, such as a fluidized bed gasifier, that is used to generate reducing gas. The COG may also be directly injected into the shaft furnace, after optional tar and heavy hydrocarbon separation, without the conventionally required reforming or PDX processing.

BRIEF SUMMARY OF THE INVENTION

Accordingly, in various exemplary embodiments, the present invention provides a DR process that utilizes COG by injecting it into a coal gasification reactor, such as a fluidized bed gasifier, that is used to generate reducing gas. The COG may also be directly injected into the shaft furnace, after optional tar and heavy hydrocarbon separation, without the conventionally required reforming or PDX processing.

In one exemplary embodiment, the present invention provides a method for producing direct reduced iron (DRI), comprising: generating a reducing gas in a coal gasifier using coal, oxygen, steam, and a first coke oven gas (COG) stream as inputs to the coal gasifier; and delivering the reducing gas to a shaft furnace and exposing iron ore agglomerates to the reducing gas to form metallic iron agglomerates. The method further comprises delivering a second COG stream to the shaft furnace. Optionally, the method further comprises delivering the second COG stream to one or more of a transition zone and a cooling zone below a primary reducing zone within the shaft furnace. The method further comprises removing sulfur from the reducing gas prior to delivering the reducing gas to the shaft furnace. The method further comprises heating the reducing gas prior to delivering the reducing gas to the shaft furnace. The method further comprises compressing the first COG stream. The method further comprises compressing the second COG stream. Optionally, the method further comprises removing one or more of tar and heavy hydrocarbons from the first COG stream. Optionally, the method further comprises removing one or more of tar and heavy hydrocarbons from the second COG stream. Optionally, the first coke oven gas stream is input to the coal gasifier coincident with the oxygen. Optionally, the first coke oven gas stream is input to the coal gasifier coincident with the coal. The method further comprises recycling a top gas stream from the shaft furnace to the shaft furnace as part of thew reducing gas after one or more of cooling the top gas stream, cleaning the top gas stream, compressing the top gas stream, and removing carbon dioxide from the top gas stream.

In another exemplary embodiment, the present invention provides an apparatus for producing direct reduced iron (DRI), comprising: a coal gasifier for generating a reducing gas using coal, oxygen, steam, and a first coke oven gas (COG) stream as inputs to the coal gasifier; and a conduit for delivering the reducing gas to a shaft furnace and exposing iron ore agglomerates to the reducing gas to form metallic iron agglomerates. The apparatus further comprises a conduit for delivering a second COG stream to the shaft furnace. Optionally, the apparatus further comprises a conduit for delivering the second COG stream to one or more of a transition zone and a cooling zone below a primary reducing zone within the shaft furnace. The apparatus further comprises a treatment system for removing sulfur from the reducing gas prior to delivering the reducing gas to the shaft furnace. The apparatus further comprises a heater for heating the reducing gas prior to delivering the reducing gas to the shaft furnace. The apparatus further comprises a compressor for compressing the first COG stream. The apparatus further comprises a compressor for compressing the second COG stream. Optionally, the apparatus further comprises a treatment system for removing one or more of tar and heavy hydrocarbons from the first COG stream. Optionally, the apparatus further comprises a treatment system for removing one or more of tar and heavy hydrocarbons from the second COG stream. Optionally, the first coke oven gas stream is input to the coal gasifier coincident with the oxygen. Optionally, the first coke oven gas stream is input to the coal gasifier coincident with the coal. The apparatus further comprises a conduit for recycling a top gas stream from the shaft furnace to the shaft furnace as part of thew reducing gas after one or more of cooling the top gas stream, cleaning the top gas stream, compressing the top gas stream, and removing carbon dioxide from the top gas stream.

BRIEF DESCRIPTION OF THE DRAWINGS

The present invention is illustrated and described herein with reference to the various drawings, in which like reference numbers are used to denote like method steps/apparatus components, as appropriate, and in which.

DETAILED DESCRIPTION OF THE INVENTION

Figure 1:
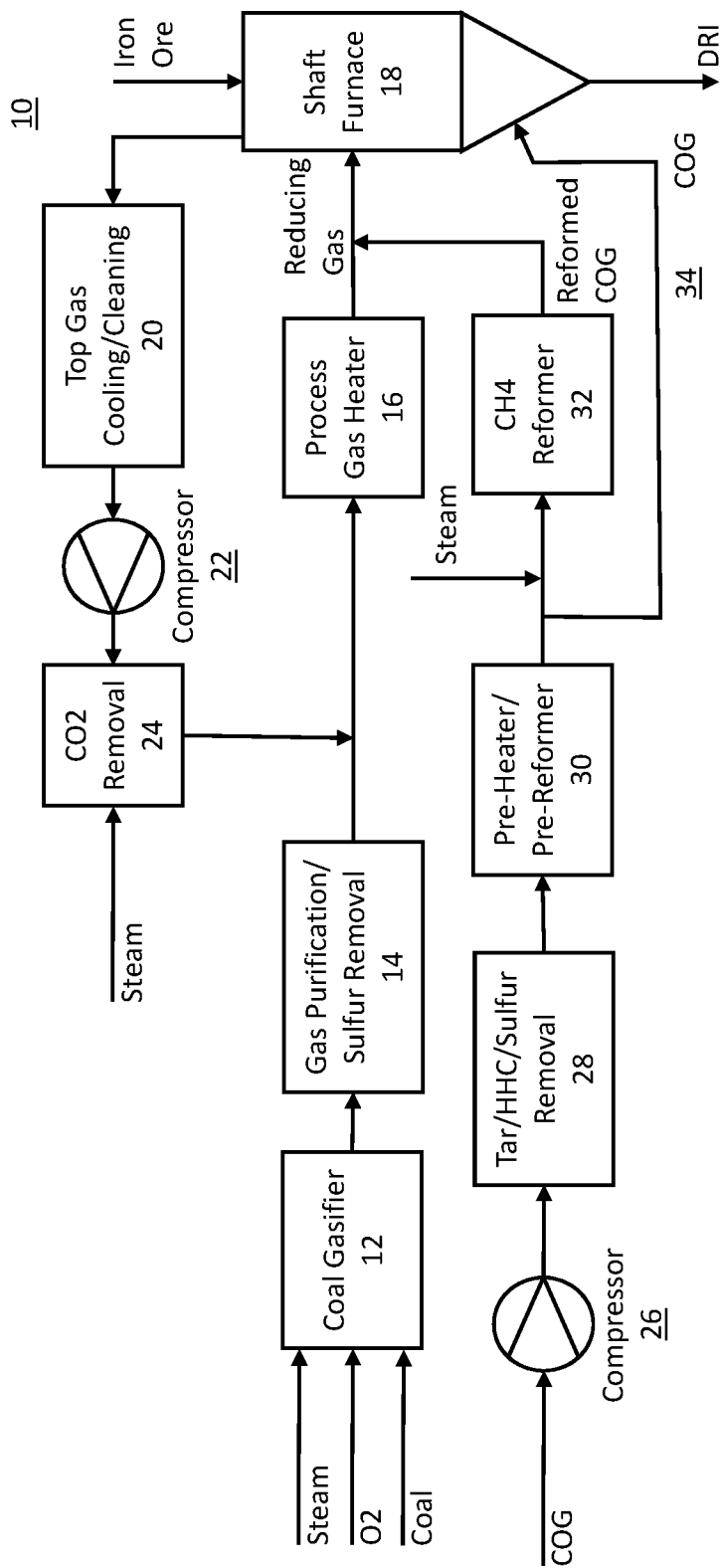
FIG. 1 is a schematic diagram illustrating one conventional DR process utilizing coal gasification and COG.

FIG. 1 illustrates a conventional DR process 10 utilizing COG and coal gasification. Coal, O2, and steam are fed into a coal gasifier 12 to generate reducing gas, which is purified via sulfur removal 14 and heated in a process gas heater 16 prior to being injected into the shaft furnace 18, in which iron ore is reduced to DRI in a process well known to those of ordinary skill in the art. Top gas is withdrawn from the shaft furnace 18, cooled/cleaned in a cooler/scrubber 20, compressed in a compressor 22, and processed through a steam-fed CO2 removal system 24 prior to being recycled back to the reducing gas stream upstream of the process gas heater 16, for example. COG is compressed in another compressor 26, tar/heavy hydrocarbons/sulfur are removed 28, and heating is performed in a pre-heater/pre-former 30 prior to the COG being reformed in a CH4/steam reformer 32 to form a reformed COG stream that is added to the reducing gas stream downstream of the process gas heater 16, for example. In addition, a second COG stream 34 may bypass the CH4/steam reformer 32 and be injected directly into the shaft furnace 18 separate from the reducing gas stream, such as into the transition zone and/or cooling zone of the shaft furnace 18.

Figure 2:
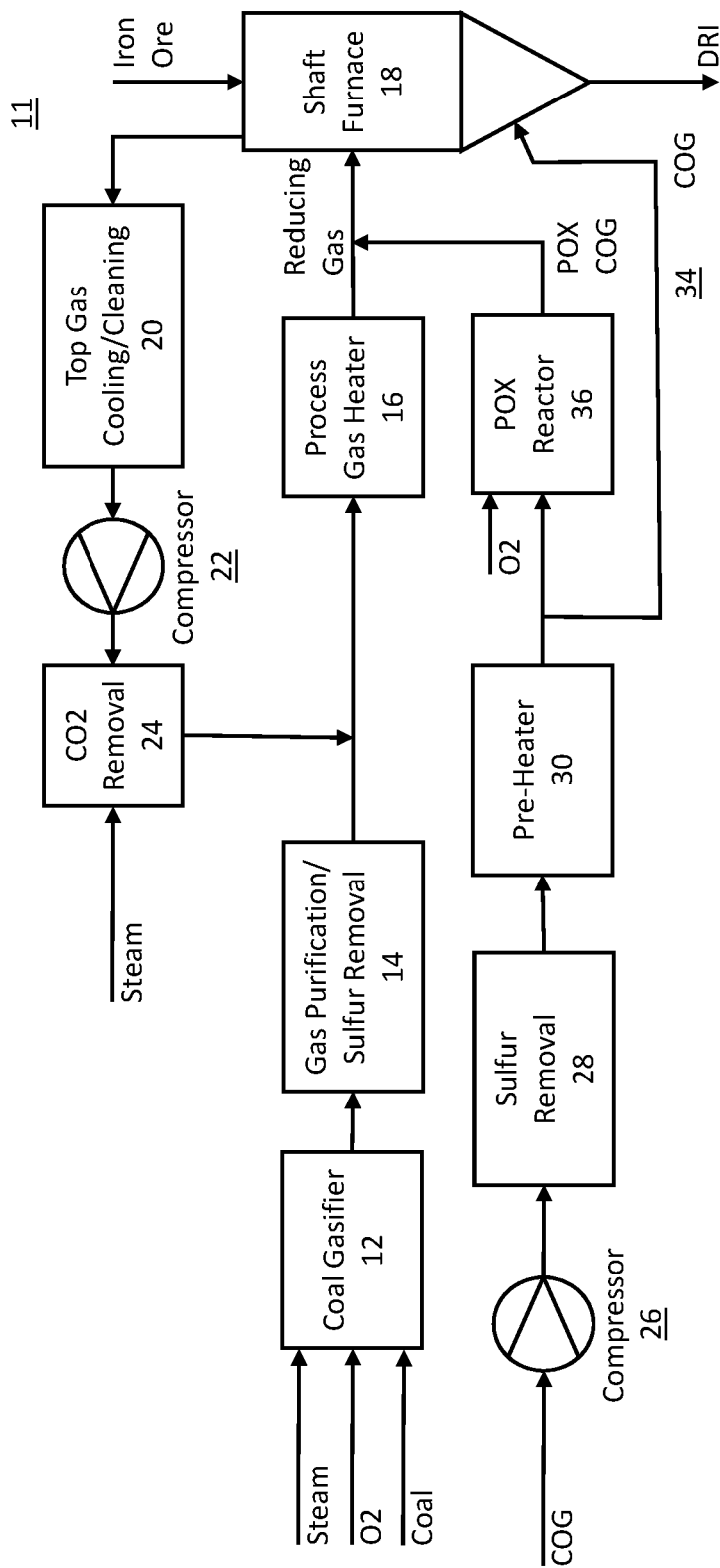
FIG. 2 is a schematic diagram illustrating another conventional DR process utilizing coal gasification and COG.

Likewise, FIG. 2 illustrates a conventional DR process 11 utilizing COG and coal gasification. Coal, O2, and steam are fed into a coal gasifier 12 to generate reducing gas, which is purified via sulfur removal 14 and heated in a process gas heater 16 prior to being injected into the shaft furnace 18, in which iron ore is reduced to DRI in a process well known to those of ordinary skill in the art. Top gas is withdrawn from the shaft furnace 18, cooled/cleaned in a cooler/scrubber 20, compressed in a compressor 22, and processed through a steam-fed CO2 removal system 24 prior to being recycled back to the reducing gas stream upstream of the process gas heater 16, for example. COG is compressed in another compressor 26, sulfur is removed 28, and heating is performed in a pre-heater 30 prior to the COG being reacted in am O2-fed PDX reactor 36 to form a PDX COG stream that is added to the reducing gas stream downstream of the process gas heater 16, for example. In addition, a second COG stream 34 may bypass the PDX reactor 36 and be injected directly into the shaft furnace 18 separate from the reducing gas stream, such as into the transition zone and/or cooling zone of the shaft furnace 18.

Figure 3:
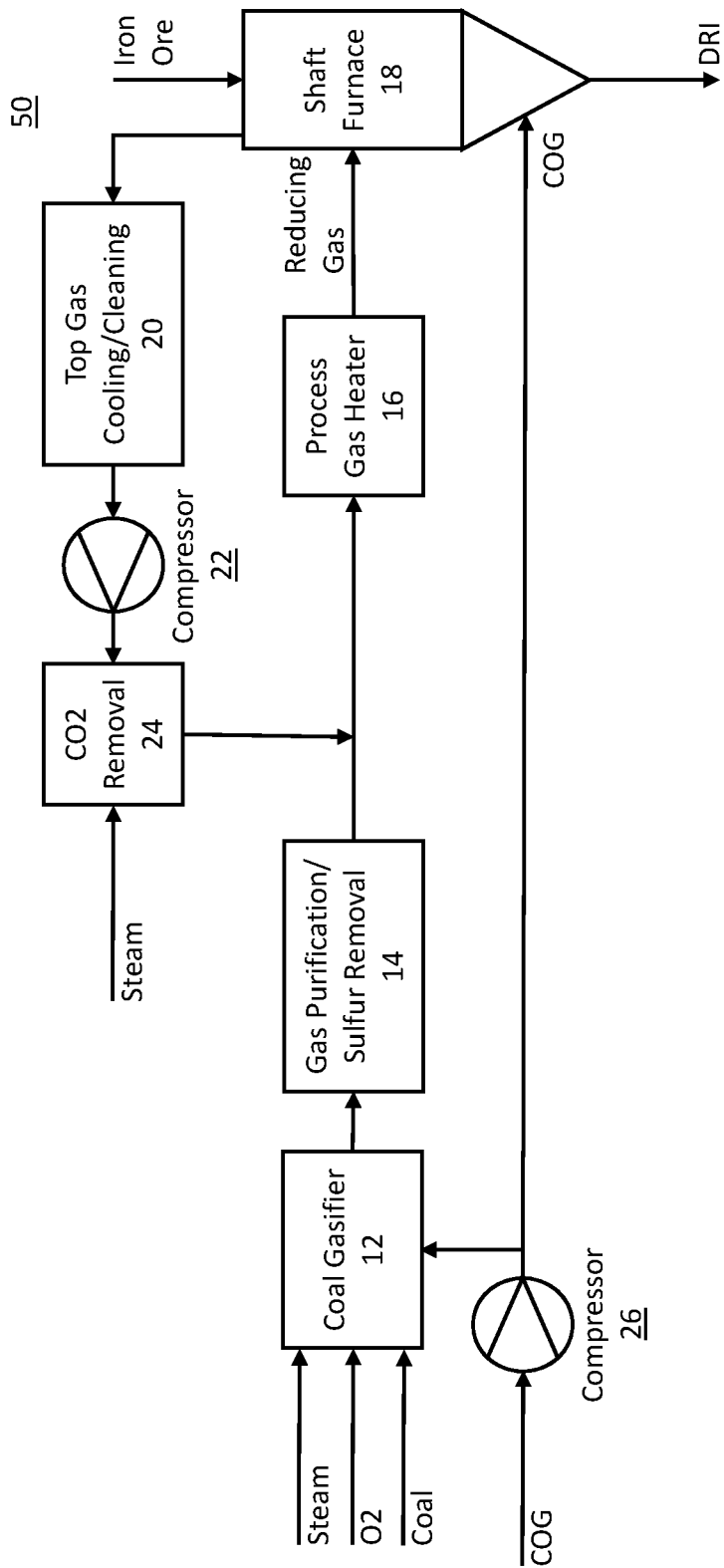
FIG. 3 is a schematic diagram illustrating one exemplary embodiment of the DR process utilizing coal gasification and COG of the present invention.

Referring now specifically to FIG. 3, in one exemplary embodiment of the present invention, a DR process 50 utilizing COG and coal gasification contemplates that coal, O2, and steam are fed into a coal gasifier 12 to generate reducing gas, which is purified via sulfur removal 14 and heated in a process gas heater 16 prior to being injected into the shaft furnace 18, in which iron ore is reduced to DRI in a process well known to those of ordinary skill in the art. Top gas is withdrawn from the shaft furnace 18, cooled/cleaned in a cooler/scrubber 20, compressed in a compressor 22, and processed through a steam-fed CO2 removal system 24 prior to being recycled back to the reducing gas stream upstream of the process gas heater 16, for example. Importantly, COG is compressed in another compressor 26 and split, with a first stream being sent to the coal gasifier 12 and a second stream being sent directly to the shaft furnace 18 separate from the reducing gas stream, such as to the transition zone and/or cooling zone of the shaft furnace 18.

Figure 4:
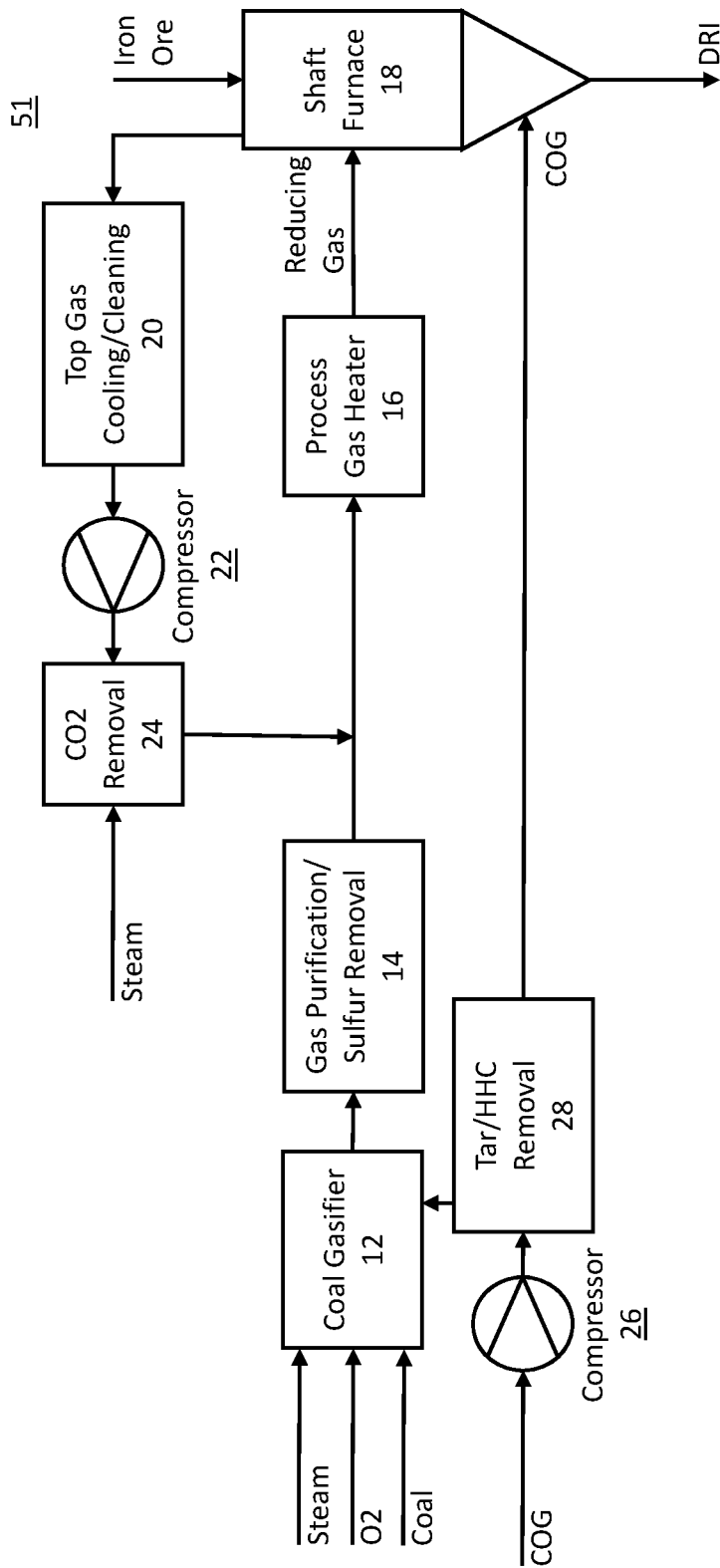
FIG. 4 is a schematic diagram illustrating another exemplary embodiment of the DR process utilizing coal gasification and COG of the present invention.

Referring now specifically to FIG. 4, in another exemplary embodiment of the present invention, a DR process 51 utilizing COG and coal gasification contemplates that coal, O2, and steam are fed into a coal gasifier 12 to generate reducing gas, which is purified via sulfur removal 14 and heated in a process gas heater 16 prior to being injected into the shaft furnace 18, in which iron ore is reduced to DRI in a process well known to those of ordinary skill in the art. Top gas is withdrawn from the shaft furnace 18, cooled/cleaned in a cooler/scrubber 20, compressed in a compressor 22, and processed through a steam-fed CO2 removal system 24 prior to being recycled back to the reducing gas stream upstream of the process gas heater 16, for example. Importantly, COG is compressed in another compressor 26 and split, with a first stream being sent to the coal gasifier 12 and a second stream being sent directly to the shaft furnace 18 separate from the reducing gas stream, such as to the transition zone and/or cooling zone of the shaft furnace 18. The second stream is subjected to tar and/or heavy hydrocarbon removal 28 either before or after the compressing operation.

Figure 5:
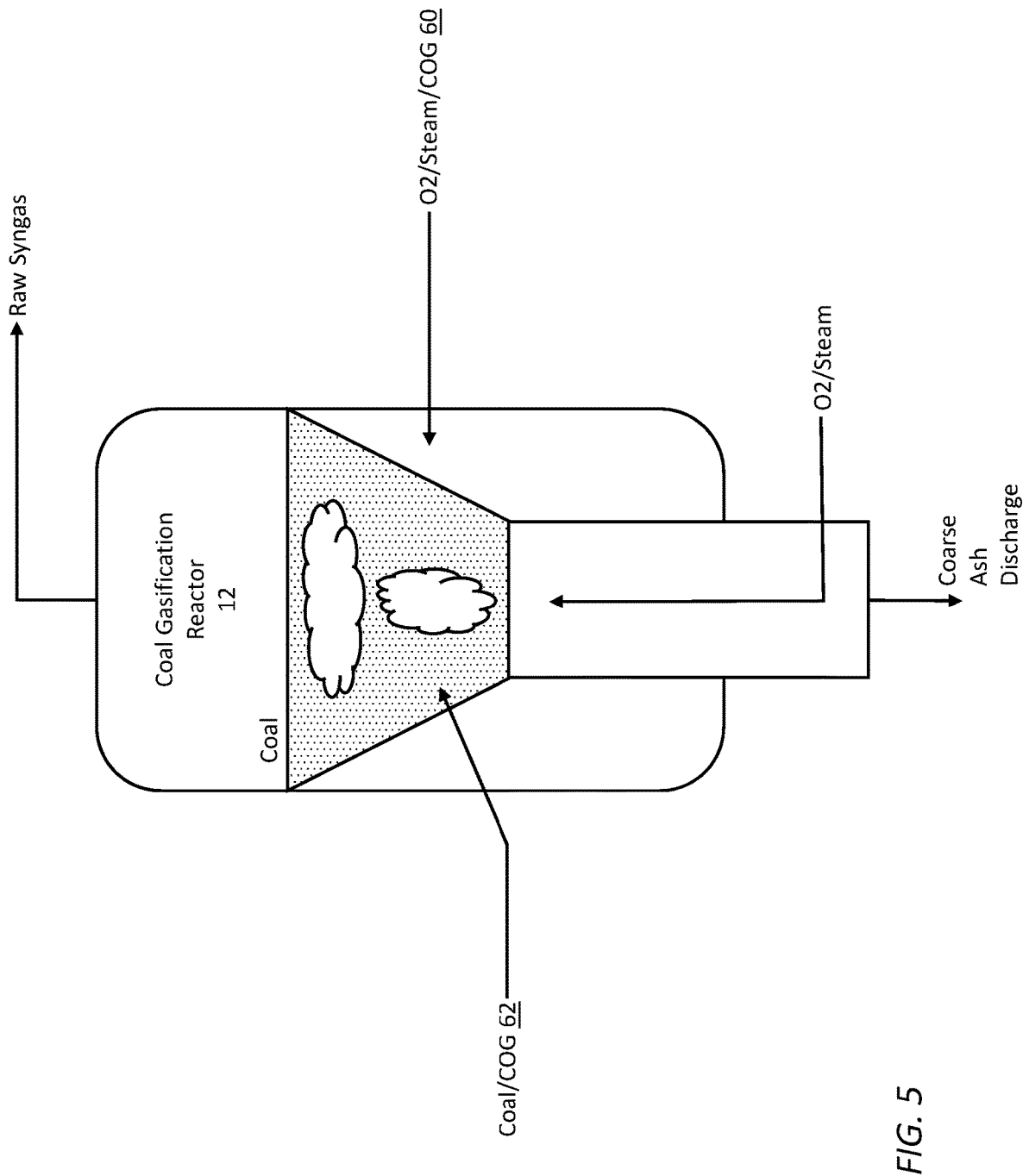
FIG. 5 is a schematic diagram illustrating one exemplary embodiment of the injection of COG into the coal gasification reactor of the present invention.

Referring now specifically to FIG. 5, in one exemplary embodiment of the present invention, by introducing COG directly into the coal gasification reactor 12, the tar and heavy hydrocarbons in the COG are efficiently converted to a syngas component (mainly H2 and CO) and/or oxidant (H2O and CO2). This optionally eliminates the need for an independent system to remove the tar and heavy hydrocarbons in the COG which cause issues in the DR process. The energy of the tar and heavy hydrocarbons in the COG is utilized as the energy source for the coal gasification process. By introducing COG into the coal gasification reactor 12, CH4 in the COG is reformed into H2 and CO. Additional reforming equipment for the excess CH4 necessary for the DR process is not required.

COG is injected into the coal gasification reactor 12, or more effectively injected, at the highest temperature region around the O2 jet 60 in the fluidized coal gasification reactor 12. Or, COG can be injected into the coal gasification reactor 12 as the coal pneumatic transport carrier gas for the coal feed system 62. In this case, it is preferable to filter the COG through the absorbent, which could be feed coal, in order to remove all moisture and tar which could cause the clogging in the pneumatic conveying pipe. This COG injection contributes to increasing the energy efficiency of coal gasification with the fluidized bed gasifier 12 since the steam and O2 injection rate into the coal gasification reactor 12 can be reduced to maintain the fluidized gas volume with COG. This reduces steam, O2, and coal consumption to make syngas.

In injecting COG into the gasifier 12, CO2 and sulfur derived from the COG can be removed by a coal syngas treatment system 14, such as an AGR system. Sulfur can be recovered as the element sulfur. CO2 will be sequestrated for other use or separately vented to the ambient. Note that COG cannot be introduced into the syngas AGR system because COG coming from coke oven plant still contains some amount of ammonia, tars and heavy hydrocarbons which deteriorates the absorbent and/or element of the AGR system. So, the additional pretreatment system for COG is required in case of directly introducing COG into the AGR system.

In accordance with the present invention, COG is injected at the high temperature section around the oxygen jet 60 in the coal gasification reactor 12, which enables the tar, heavy hydrocarbons, and CH4 to be reformed efficiently.

COG is injected together with steam as the fluidized gas or shroud gas 62 in the fluidized bed coal gasification reactor 12, which enables one to increase the energy efficiency.

Coal is normally injected into the coal gasification reactor 12 by the pneumatic transport system. Compressed CO2 or other inert gas commonly used as the pneumatic carrier gas can be replaced by COG as an option, which enables one to increase the energy efficiency. In this case, it is preferable to filter the COG through the absorbent, which could be the feed coal, in order to remove a moisture and tar which could cause clogging in the pneumatic conveying pipe.

COG can be injected into the coal gasification reactor after being mixed with shaft furnace top gas when top gas is recycled to the coal gasification reactor, as described by US2016/0186276.

To decrease the compression of COG before introducing it into the coal syngas reactor, a low-pressure coal gasification process (at most 10-15 barg), such as a fluidized bed gasification technology, is preferred. Conventional coal gasification technologies, such as entrained bed gasifier and moving bed gasifier, apply high pressure like 40~60 barg, but COG is typically low pressure, less than 1 barg.

As described herein above, some of the COG can be injected directly into the shaft furnace simultaneously with COG injection into the coal gasification reactor. The injection ratio for two locations can be controlled according to the optimum process conditions, such as the shaft furnace burden temperature or CH4% in the reduction gas introduced into the shaft furnace. Too much direct COG injection into the shaft furnace decreases the temperature in the shaft furnace reduction zone due to the low sensible heat or too much CH4 cracking or insitu-reforming in the shaft furnace.

Tar and oils are likely converted to syngas better than CH4 in a coal gasification reactor. So, alternatively, the tar/heavy hydrocarbons preliminary separated from the COG can be injected into the coal gasification reactor. Other portions containing more CH4, H2, and CO can be directly sent to the direct reduction process, especially injected into the SF. This concept is very convenient, especially when a lot of tar and heavy hydrocarbon contained in COG is heated and introduced into the shaft furnace because the tar and heavy hydrocarbon causes the coking or carbon deposit issues at the heat exchanger tubes or the refractory duct wall under the higher temperature. For example, COG can be treated by PSA to recover H2 rich gas. Only the tail gas can be injected into the coal gasification reactor and H2 rich gas recovered will be directly sent to the shaft or produced as a by-product.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method for producing direct reduced iron (DRI), comprising:
   generating a reducing gas in a coal gasifier using coal, oxygen, steam, and a first coke oven gas (COG) stream as inputs to the coal gasifier, wherein the first COG stream is reformed by the coal gasifier and tar and heavy hydrocarbons in the first COG stream are converted to one or more of a reducing gas component and an oxidant in the coal gasifier; and
   delivering the reducing gas to a shaft furnace and exposing iron ore agglomerates to the reducing gas to form metallic iron agglomerates.

2. The method of claim 1, further comprising delivering a second COG stream to the shaft furnace.

3. The method of claim 2, further comprising delivering the second COG stream to one or more of a transition zone and a cooling zone below a primary reducing zone within the shaft furnace.

4. The method of claim 1, further comprising removing sulfur from the reducing gas prior to delivering the reducing gas to the shaft furnace.

5. The method of claim 1, further comprising heating the reducing gas prior to delivering the reducing gas to the shaft furnace.

6. The method of claim 1, further comprising compressing the first COG stream.

7. The method of claim 2, further comprising compressing the second COG stream.

8. The method of claim 2, further comprising removing one or more of tar and heavy hydrocarbons from the second COG stream.

9. The method of claim 1, wherein the first coke oven gas stream is input to the coal gasifier coincident with the oxygen.

10. The method of claim 1, wherein the first coke oven gas stream is input to the coal gasifier coincident with the coal.

11. The method of claim 1, further comprising recycling a top gas stream from the shaft furnace to the shaft furnace as part of the reducing gas after one or more of cooling the top gas stream, cleaning the top gas stream, compressing the top gas stream, and removing carbon dioxide from the top gas stream.

\* \* \* \* \*